United States Patent [19]

Parks

[11] Patent Number: 5,371,140
[45] Date of Patent: Dec. 6, 1994

[54] EMULSIFIABLE PHENOLIC RESOLE RESIN

[75] Inventor: Claude P. Parks, Lacey, Wash.

[73] Assignee: Georgia-Pacific Resins, Inc., Atlanta, Ga.

[21] Appl. No.: 221,469

[22] Filed: Apr. 1, 1994

Related U.S. Application Data

[63] Continuation of Ser. No. 982,297, Nov. 25, 1992, abandoned.

[51] Int. Cl.$^5$ ............................................. C08G 63/91
[52] U.S. Cl. ............................. 525/54.42; 528/230; 528/239; 528/243; 528/254; 528/256; 525/480; 525/486; 525/534; 524/779; 524/801
[58] Field of Search ............... 528/230, 239, 243, 254, 528/256; 525/54.42, 480, 486, 534; 524/779, 801

[56] References Cited

U.S. PATENT DOCUMENTS

| | | | |
|---|---|---|---|
| 2,424,383 | 7/1947 | Calvert | 525/25 |
| 3,428,593 | 2/1969 | Higginbottom | 524/841 |
| 3,616,179 | 10/1971 | McCombs | 524/595 |
| 3,624,246 | 11/1971 | Deuzeman | 528/245.5 |
| 3,666,694 | 5/1972 | Ingram, II | 523/417 |
| 3,684,467 | 8/1972 | Smucker | 65/3.43 |
| 3,719,616 | 3/1973 | Ingram, II | 524/25 |
| 3,862,060 | 1/1975 | Anderson et al. | 524/25 |
| 3,887,539 | 6/1975 | Barth | 524/300 |
| 3,956,204 | 5/1976 | Higginbottom | 524/25 |
| 3,956,205 | 5/1976 | Higginbottom | 524/25 |
| 4,014,726 | 3/1977 | Fargo | 156/167 |
| 4,060,504 | 11/1977 | Higginbottom | 524/25 |
| 4,129,674 | 12/1978 | Hannes et al. | 428/285 |
| 4,480,068 | 10/1984 | Santos et al. | 524/456 |
| 4,532,006 | 7/1985 | Winters et al. | 162/3 |
| 4,637,951 | 1/1987 | Gill et al. | 428/215 |
| 4,663,419 | 5/1987 | Fugier et al. | 528/164 |
| 4,758,478 | 7/1988 | Daisy et al. | 428/529 |
| 5,001,005 | 3/1991 | Blanpied | 428/283 |
| 5,011,886 | 4/1991 | Buschfeld et al. | 524/596 |

OTHER PUBLICATIONS

"Emulsions and Emulsion Technology", Part I, Surfactant Series, vol. 6, published by Marcel Dekker, Inc., N.Y., N.Y., pp. 1–11 and 35–43 (1974?; investigating copyright date for copy supplied).

"Emulsions" by W. C. Griffin, Encyclopedia of Chemical Technology, vol. 8, Second Edition, pp. 117–154, ©1965 by John Wiley & Sons, Inc.

Technical Data Sheets: "Casein and Casein Solutions", by National Casein, Chicago, Ill., Coversheet and pages 1–5, dated Jul. 18,1991.

*Primary Examiner*—Samuel A. Acquah
*Attorney, Agent, or Firm*—Banner, Birch, McKie & Beckett

[57] ABSTRACT

A emulsifiable, phenolic-resole-resin-based composition comprising a low salt, urea-extended phenol aldehyde resin and an emulsifying agent, wherein the resin has a water dilutability ranging from about 2:1 to about 10:1 v/v water to resin prior to neutralization and aldehyde scavenger addition, and the method for making the same.

24 Claims, No Drawings

EMULSIFIABLE PHENOLIC RESOLE RESIN

This application is a continuation of application Ser. No. 07/982,297, filed Nov. 25, 1992, now abandoned.

BACKGROUND OF THE INVENTION

1. Field of the Invention:

The present invention relates to emulsifiable, liquid, homogeneous, one phase phenolic resole resins and to emulsions prepared therefrom using an emulsifying agent, such as a proteinaceous compound, in combination with the resole resin.

2. Description of the Prior Art:

The concept of phenolic resins emulsions is in general well known in the prior art and such emulsions have been recommended for use in impregnations and binder applications for binding fibers in the form of felts or sheets of fibers, such as non-woven fiber mats.

Non-woven fiber mats are typically manufactured by a process known as "wet" process. This process is well known in the art, and as typified by the disclosure in U.S. Pat. No. 4,129,674. Inorganic fibers are commonly used in fiber mats. Glass fibers, mineral wool and carbon fibers are examples of such inorganic fibers. Further, fibers of various sizes may be blended together to form the mat. See, for example, U.S. Pat. No. 4,637,951 to Gill et al. and U.S. Pat. No. 4,129,674 to Hannes et at. It is also known that mineral wool may be partially or wholly substituted for glass wool (i.e. glass fibers) in a blended mat. See, for example U.S. Pat. No. 4,532,006 to Winters et al. Ultimately, the fibers in the wet process mat are bonded to each other using chemical binders such as urea-, phenol-, or melamine-aldehyde condensation resins. Preferably, the fibers are bonded using a cured phenol-formaldehyde resin. The binder may also contain filler materials such as clay and gypsum among others. See U.S. Pat. No. 5,001,005 to Blanpied.

The properties desired of binder compositions depend to a large extent on the properties of the basic resin. A good binder composition should above all be easily applied and capable of covering and/or bonding the fibers, and at the same time it should cause little pollution. Further, the resin should have good long term stability and a high degree of dilutability with water. Since the concept of dilutability is particularly important, it will be defined for the purposes of the present invention as follows: The water dilutability of a resin solution is the volume of deionized water which can be added at a given temperature to one unit volume of this solution without producing any permanent perturbation, i.e., haze, clouding or precipitation.

Of particular interest are high efficiency single phase aqueous phenol-formaldehyde resins which have low free phenol, low free formaldehyde and low saligenin (ortho-hydroxybenzyl alcohol). Such resins retain a high percentage of the organic moiety when the resin is cured. However, the free phenol, free formaldehyde and saligenin volatilize in the curing of the resin causing pollution considerations and also reducing the efficiency and performance of the resin in various bonding applications. Accordingly, it is necessary that the resin should be as free as possible from any unconverted starting materials or residues thereof while preserving its useful qualities. The risk of atmospheric pollution is in fact mainly due to the presence of volatile monomers. These consist, for example, the starting materials required for producing the resin, e.g. formaldehyde and phenol, which have been left unconverted by the reaction or regenerated in the course of binding the fibers or subsequently.

A high efficiency resin is extremely valuable to the industry since it results in a greater economic advantage over conventional resins. Even more important is the increase in performance of the resin in bonding applications. However, in addition to the problems dealing with unconverted starting materials, another of the unfortunate drawbacks with a high efficiency single phase aqueous phenol formaldehyde resin is the instability of the resin which results in the formation of a solid or crystal phase. This crystal phase is extremely difficult to dissolve and prevents uniform application of the resin to a substrate.

As is well known in the art, the normal base catalyzed addition reaction of formaldehyde with phenol produces via methylolation a mixture of five mono-,di-, and tri-methylolated phenol monomers which are potential intermediates for dimer formation via condensation. In dimerization of these methylolated phenols, the formation of bis (4-hydroxy-3,5-dimethylolphenyl) methane is favored and when the ratio of formaldehyde to phenol is high, i.e., when it is above 2.0, substantial amounts of bis (4-hydroxy-3,5-dimethylolphenyl) methane (i.e., tetradimer) is formed. Even when the proportion of tetradimer is relatively low and methylolated phenols are in relatively high concentrations, the tetradimer crystallizes out from conventional resoles when the formaldehyde content is below 3 percent and the pH is adjusted to less than 8.5, particularly at pH in the range of 6 to 8 and at low temperatures in the range of about 0° to about 20° C., preferred for storage. See U.S. Pat. No. 3,956,204 to Higginbottom. This crystal phase is extremely difficult to be dissolved. Heating the resin to elevated temperatures helps to re-dissolve the crystal phase, but unfortunately, such exposure to high temperatures will also advance the resin, increasing its molecular weight and decreasing its water tolerance, so that its application performance is adversely affected. Filtering out the crystals is of little benefit because the resulting resin is reduced in efficiency and the bonding characteristics are impaired. Moreover, the economics of the process become unfavorable and a problem of disposing tetradimer is created.

The prior art regarding the manufacture of phenolic resole resins has concentrated on preventing the formation of tetradimer or treating the resole resin to stabilize the tetradimer formed.

U.S. Pat. No. 3,428,593 maintains the stability of the resole system by the addition of formaldehyde after manufacture. This resole is water soluble. The mechanism for maintaining solubility and storage stability in this system is to use free formaldehyde at a level of approximately 3% to prevent the tetradimer from precipitating. Under current environmental considerations and limitations, such a system is unacceptable due to the high content of free formaldehyde which would evolve during curing. Additionally, to maintain water solubility, the phenolic species are predominately in the monomer form (i.e., trimethylolated phenol). Such is also problematic with regard to emissions of low molecular weight components during curing.

U.S. Pat. Nos. 3,956,204; 3,956,205; and 4,060,504 require an acid condensation step and use of an alkali of a divalent cation in the methylolation step to limit the formation of tetradimer. This results in the formation of dimers with open para positions which are more reactive yet do not form crystalline precipitate like tetradimer. However, these more reactive species pose stability problems at elevated temperatures (i.e., 5° to 25° C.) as they tend to further react during storage with the resulting materials settling out.

U.S. Pat. No. 4,480,068 and Canadian 1,080,871 disclose water soluble phenolic resoles prepared using basic catalysts having an alkaline earth metal divalent cation, i.e. calcium. The resulting resin has a low molecular weight as it is predominantly monomers for imparting water solubility. However, higher emissions of phenolic species are expected during curing. The divalent cation catalysts also favor the formation of dimers with open para positions and the resulting resoles likewise suffer from the associated instability problems at elevated temperatures (i.e., 5° to 25° C.). Further, the divalent cations also interfere with emulsification in that they tend to couple or bridge and agglomerate anionic species, e.g. phenolic species.

U.S. Pat. No. 3,862,060 discloses the production of phenolic resin emulsions. The process utilizes amine catalysts during condensation and aminotriazines in the methylolation step to increase water insolubility. That is, the resin has such a low tolerance for water that it is emulsified on manufacture at high solids. U.S. Pat. No. 3,862,060 also enumerates problems associated with utilizing alkali metal catalysts and teaches away from their use.

U.S. Pat. No. 4,663,419 discloses phenol formaldehyde resoles with urea addition catalyzed with sodium hydroxide. The resoles thereof are water soluble and are dilutable in water to at least 1,000%. In example 3 thereof, the resin was infinitely dilutable. The resole resins disclosed therein are prepared using a specific temperature cycle having three phases: a heating phase, a phase during which the temperature is maintained, and a cooling phase. Urea is added during the cooling phase, preferably during the first half of the cooling phase. The cycle does not exceed seven hours in duration. Further, the phase during which the temperature is kept constant is limited to at most about 90 minutes. Example 1 provides an example when the temperature is maintained at 70° C. for about 71 minutes and in example 2 the temperature is maintained at 70° C. for 90 minutes.

Additionally, various methods aimed at reducing the volatile monomer content present in such compositions based on a phenoplast resin have been proposed. The principle of these methods is based on the idea of increasing the initial molar ratio of formaldehyde to phenol in order to lower the uncombined and consequently free phenol content and at the same time bind the free formaldehyde present in excess by means of nitrogen compounds, in particular urea. See, for example, U.S. Pat. No. 3,616,179 wherein phenol, formaldehyde and urea are simultaneously charged to the reactor and reacted together and U.S. Pat. Nos. 3,684,467 and 4,014,726 wherein phenol, formaldehyde and dextrine or dicyandiamide (formaldehyde scavengers) are simultaneously charged to the reactor and reacted together with urea added during the cooling phase of the reaction. U.S. Pat. No. 4,480,068 to Santos et al. discloses that a variety of special binder systems have been designed for use in mineral fiber insulating material adapted to withstand high temperatures. These resins are phenol-formaldehyde resins which are modified with nitrogen-containing compounds, such as urea, dicyandiamide and melamine in various combinations. See U.S. Pat. Nos. 3,624,246 and 3,956,204. However, U.S. Pat. No. 4,480,068 notes that these nitrogen modified resins, for the most part, are difficult to manufacture, and have poor storage stability, short gel times and poor processability.

A need therefore exists for high efficiency stable single phase, phenolic resole resins which contain low concentrations of phenol and aldehyde such as formaldehyde, and thus cause substantially less pollution of the atmosphere than prior art resins. A further need exists for such resins in emulsifiable form so that they maybe used to prepare stable high efficiency phenol formaldehyde emulsions for impregnation of sheet members and fibrous substrates and as binders for fibrous mats, wherein the fibers are of organic and/or inorganic origin.

SUMMARY OF THE INVENTION

The invention comprises an emulsifiable phenotic resole resin composition comprising:

a resole resin prepared by reacting phenol and an aldehyde, preferably formaldehyde, at a mole ratio of aldehyde to phenol in the range from about 2.0:1 to about 6.0:1, preferably from about 2.5:1 to about 5.0:1, in the presence of an effective catalytic amount of a basic catalyst having a mono-valent alkali metal cation, neutralizing the basic catalyst, and adding an aldehyde scavenger, said composition having a free phenol content below 0.5% by weight and a free aldehyde content below 1% by weight, preferably below 0.5% by weight, based on the weight of said composition, wherein the effective catalytic amount does not exceed 1% by weight, preferably not to exceed 0.9% by weight, based on the composition, the aldehyde and phenol mixture is maintained at a temperature in the range from 65° C. to about 85° C. during condensation and methylolation, and the molecular weight of the resole resin is advanced during condensation and methylolation until the resole resin at this point has a water dilutability ranging from about 2:1 to about 10:1 v/v water to resin, preferably from about 3:1 to about 7:1 v/v water to resin. The resole resin after neutralization and adding the aldehyde scavenger typically has a water haze point less than or equal to 2.5:1 v/v water to resin, preferably less than or equal to 1.5:1, and yet more preferably less than or equal to 1:1, and remains water dilutable after water-insoluble species therein have been emulsified; and an emulsifying agent.

Further, the invention comprises a method for preparing an emulsifiable phenolic resole resin composition. The method comprising:

reacting a mixture of a phenol and an aldehyde at a mole ratio of aldehyde to phenol in the range from about 2.0:1 to about 6.0:1, preferably from about 2.5:1 to about 5.0:1, in the presence of an effective catalytic amount of a basic catalyst having a mono-valent alkali metal cation, maintaining the aldehyde and phenol mixture at a temperature in the range from 65° C. to about 85° C. during the reaction step, the reaction step including condensation and methylolation, and advancing the molecular weight of the resole resin during condensation and methylolation until the resole resin at this point has a water dilutability ranging from about 2:1 to about 10:1, preferably from about 3:1 to about 7:1, v/v water to resin and the composition has a free phenol content below 0.5% by weight, based on the weight of the composition, neutralizing the basic catalyst, and adding an effective amount of an aldehyde scavenger to reduce the free aldehyde content below 1% by weight, preferably below 0.5% by weight, based on the weight of said composition, wherein the effective catalytic amount does not exceed 1% by weight, preferably not to exceed 0.9% by weight, based on the composition. The phenol is preferably phenol (i.e., $C_6H_5OH$). The aldehyde is preferably formaldehyde.

The preparation of the resin is carried out in a temperature cycle which falls into three phases: a heating phase, a reaction phase during which the temperature is maintained, and a cooling phase. Typically, during the reaction phase, the temperature is kept constant for at least 180 minutes to achieve the necessary advance in molecular weight of the resin and the prescribed water dilutability at this point of the reaction.

Water dilutability is used to monitor the molecular weight advancement of the phenolic species during the alkaline methylolation-condensation step in resin preparation, i.e., the reaction phase. As the phenolic species condense and increase in molecular weight, they lose water solubility. The molecular weight advancement is stopped when the water dilutability ranges from about 2:1 to about 10:1, preferably 3:1 to about 7:1, v/v water to resin. This results in a finished, formaldehyde scavenged and pH 8 neutralized resin having a water solubility (water haze point) of at most about 2.5:1 v/v water to resin. It should be noted that the water solubility of the finished resin is lower than of the in-process sample (during the reaction phase) due to the neutralization of the alkaline catalyst and not an increase in the molecular weight of the phenolic species. For purposes of the present invention, water dilutability is utilized to reference the water solubility of the reaction phase sample of the unneutralized resole resin and water haze point is utilized to reference the water solubility of the finished resin prior to incorporating the emulsifying agent.

Contrary to the prior art teachings, the method of the present invention favors the formation of the tetradimer. In this regard, the aldehyde to phenol mole ratio is targeted in the range from about 2.0:1 to about 6.0:1 and monovalent alkali metal catalysts are used to favor tetradimer formation, rather than dimers with open para positions. A key to the stability of the tetradimer is maintaining a low salt content, i.e. low catalyst content. The catalyst content is less than or equal to 1% by weight, preferably less than or equal to 0.9% by weight, based on the total composition.

The resins of the present invention are catalyzed by an alkali metal catalyst and are emulsifiable as opposed to emulsified on manufacture. As noted above, U.S. Pat. No. 3,862,060 enumerates problems associated with utilizing alkali metal catalysts and teaches away from their use. However, the use of alkali metal catalysts is critical in the present invention. Further, being emulsifiable rather than an emulsion, an advantage of the resins of the present invention is that the resins (before dilution) are not affected by freezing as are emulsions. In emulsions, freezing will cause emulsified particles to break up and insoluble materials to agglomerate and precipitate. Additionally, being mono-valent, the alkali metal cations do not interfere with emulsification as do divalent alkaline earth metal cations.

In preparing the resole resin of the present invention, the molecular weight of the resin is advanced to the point that the resin is at most slightly water soluble. The term "at most slightly water soluble" means that after neutralization and addition of the formaldehyde scavenger but prior to adding the emulsifying agent the resin has a water haze point (water solubility) of at most about 2.5:1, more preferably at most 1.5:1, water to resin on a volume to volume basis (v/v). Yet more preferably, the resin at this point is no longer regarded water soluble, i.e., having a water solubility of at most 1:1 v/v water to resin. However, the molecular weight is not advanced beyond the point at which the water-insoluble species therein lose their capability of being emulsified, for example with casein. The resin is specifically manufactured to have a water dilutability (water solubility) within a specific range prior to neutralization to achieve such a water haze point in the finished resin. The water haze point (water solubility) is the point at which the quantity of resin in water yields a permanent haze in a solution.

Accordingly, the resin of the present invention is further distinguishable from that of U.S. Pat. No. 4,663,419 based on water dilutability (water solubility). It is noted that the resin of the present invention becomes infinitely dilutable once the water insoluble species have been emulsified. However, the resins of the '419 patent require dilutability of at least 1,000% (i.e., 10:1 v/v) versus at most 250% (i.e., 2.5:1 v/v) in the present invention (without emulsification). Thus, this is indicative of the fact that the resin of the present invention is more highly advanced in molecular weight than those of the '419 patent. This is further buttressed by the fact that during the temperature maintenance phase (reaction phase), the temperature is typically held for at least 180 minutes and at times greater than 500 minutes depending on the reaction temperature, whereas those of the '419 patent are held for no more than 90 minutes.

DETAILED DESCRIPTION OF THE PREFERRED EMBODIMENTS

The invention comprises a low salt, emulsifiable, urea-extended phenol aldehyde resole resin and an emulsifying agent, wherein the resin has a specified range of water dilutability prior to catalyst neutralization and aldehyde scavenger addition, and the method for making the same.

The phenolic resins useful in the practice of the invention are characterized in the art as phenol-aldehyde resole resins. Phenol-aldehyde resole resins are well known in the art and are base catalyzed thermosetting phenol-aldehyde type resins consisting primarily of partially condensed phenol alcohols. As used in the art, the term "resole" refers to phenolic resins that contain useful reactivity, as opposed to cured resins. At this stage, the product is fully soluble in one or more common solvents, such as alcohols and ketones, and is fusible at less than 150° C. The preparation of conventional phenol-aldehyde resole resins are well known in the art. Phenol-aldehyde resole resins are generally prepared by reacting a phenol with an excess molar proportion of an aldehyde in the presence of a basic catalyst, such as an alkaline catalyst or an amine catalyst. However, the phenol-aldehyde resole resin of the present invention is prepared using specific materials in a specific order and critical proportions under specific processing conditions.

More specifically, the invention comprises an emulsifiable phenolic resole resin composition comprising: a resole resin and an emulsifying agent. The resole resin is prepared by reacting phenol and aldehyde at a mole ratio of aldehyde to phenol in the range from about 2.0:1 to about 6.0:1 in the presence of an effective catalytic amount of a basic catalyst having a mono-valent alkali metal cation, then neutralizing the basic catalyst, and finally adding an aldehyde scavenger. The composition has a free phenol content below 0.5% by weight and a free aldehyde content below 1% by weight, based on the weight of the composition. The effective catalytic amount does not exceed 1% by weight, based on the weight of the composition. The aldehyde and phenol mixture is maintained at a temperature in the range from 65° C. to about 85° C., preferably from about 68° C. to about 76° C., during the condensation and methylolation reactions. The molecular weight of the resole resin is advanced during the condensation and methylolation reactions in the reaction phase until the unneutralized resole resin at this point has a water dilutability ranging from about 2:1 to about 10:1 v/v water to resin, preferably from about 3:1 to about 7:1. The resole resin after neutralization and adding the aldehyde scavenger has a water solubility (water haze point) less than or equal to 2.5:1 v/v water to resin and remains water dilutable after water-insoluble species therein have been emulsified.

The aqueous solutions or resoles of the present invention are prepared by a one-stage reaction. The resole resin is prepared by reacting phenol and aldehyde at a mole ratio of aldehyde to phenol in the range from about 2.0:1 to about 6.0:1, preferably from about 2.5:1 to about 5.0:1, in the presence of an effective catalytic amount of a basic catalyst. The basic catalyst is one having a mono-valent alkali metal cation such as any of those known in the art. Such basic catalysts include alkali metal hydroxides such as lithium hydroxide, sodium hydroxide and potassium hydroxide, and alkali metal carbonates such as sodium carbonate and potassium carbonate. At the end of the reaction, the catalyst is neutralized by the addition of acid or acid salt to reduce the pH to between 6 and 10. The endpoint pH of the resole is preferably controlled to about 7.5 to about 8.5 when using casein, for example, by using sulfamic acid.

More specifically, the preparation of the resin is carried out in a temperature cycle which falls into three phases: a heating phase, a reaction phase during which the temperature is maintained, and a cooling phase. Typically, during the reaction phase the temperature is kept constant for at least 180 minutes to achieve the necessary advance in molecular weight of the resin and the prescribed water dilutability at this point of the reaction. Water dilutability is used to monitor the molecular weight advancement of the phenolic species during the alkaline methylolation-condensation step in resin preparation, i.e., the reaction phase. As the phenolic species condense and increase in molecular weight, they lose water solubility. The molecular weight advancement is stopped when the water dilutability ranges from about 2:1 to about 10:1, preferably 3:1 to about 7:1, v/v water to resin. This results in a finished, formaldehyde scavenged and pH 8 neutralized resin having a water solubility (water haze point) of at most about 2.5:1 v/v water to resin, more preferably at most 1.5:1, and yet more preferably at most 1:1. It should be noted that the water solubility of the finished resin is lower than of the in-process sample (during the reaction phase) due to the neutralization of the alkaline catalyst and not an increase in the molecular weight of the phenolic species. For purposes of clarification herein, water dilutability is utilized to reference the water solubility of the reaction phase sample of the resole resin and water haze point is utilized to reference the water solubility of the finished resin prior to incorporating the emulsifying agent.

The test method for determining the water dilutability involves withdrawing a 2 milliliter sample of the resole resin during the reaction phase. The resole resin at this point has a specific gravity of about 1.2 and accordingly the sample is about 2.4 grams and has about 45.5% by weight resin solids. The 2.4 grams of this intermediate resole is weighed into a 125 Erlenmeyer flask. While swirling the flask, deionized water is slowly added until a permanent haze develops in the resin-water mixture. The weight of water used to reach the haze point is recorded. Water dilutability is then reported as: (Grams of water)/2:1. The volume of water is equal to the grams of water divided by its specific gravity which is approximately 1 and the volume of resole resins is approximately 2 milliliters. To simplify the volume/volume ratio of water to resin, both sides are divided by two and accordingly the water side of the ratio is approximately equal to the grams of water divided by two. If a resin is of a solids content other than 45.5% by weight, the sample size is determined as follows: (45.5% divided by percent solids of resin in sample)×(2.4 grams) equals grams of sample. Corrections for the sample amount weighed out for the test are usually not made unless the solids deviate significantly from 45.5%, i.e., 45.5±5.0%.

During the heating phase, the reaction mixture is gradually heated to reflux. During the reaction phase, the reaction mixture is held at elevated temperatures of about 65° C. up to the reflux temperature, preferably from about 65° C. to about 85° C., until less than about 0.5% by weight free phenol remains. During the cooling phase, the reaction mixture is then cooled. Once cooled to a temperature from about 25° C. to about 50° C., an aldehyde scavenger is added to the reaction mixture to reduce the free formaldehyde content to less than 1% by weight, preferably less than 0.5% by weight. Finally, the catalyst is then neutralized with an acid. The pH is adjusted to roughly from about 6 to about 10, preferably about 7.5 to about 8.5. The resulting resin is typically has a solids content ranging from about 40 to 60 percent solids, preferably from about 45 to about 55 percent solids. The solids content of the resin may also be attained by dehydrating the resin, if need be, though typically not necessary.

The basic catalyst used in preparing the resoles of the present invention is critical and must be a basic catalyst having a mono-valent alkali metal cation such as any of those known in the art. Preferably, the basic catalysts are alkaline metal hydroxides, for instance, sodium hydroxide, lithium hydroxide and potassium hydroxide.

During methylolation and condensation, the salt content is controlled to limit it below the concentration which will cause precipitation of the tetradimer, i.e. bis(4-hydroxy-3,5-dihydroxy-methylphenyl)methane. It is noted that the use of a basic catalyst having a monovalent alkali metal cation and a formaldehyde to phenol mole ratio of at least 2.0 favors formation of the tetradimer. The salt content is controlled by maintaining the concentration of the alkali metal catalyst to less than or equal to 1% by weight, based on the total composition, preferably less than or equal to 0.9% by weight. The alkali metal catalyst concentration is kept constant during the reaction process. It is noted that if greater than 1% by weight of the alkali metal catalyst is used, tetradimer will precipitate when the catalyst is neutralized. By limiting the concentration of the alkali metal catalyst, the tetradimer is stabilized so as to prevent "salting out" of the tetradimer during catalyst neutralization. This increases the storage life of the resin at elevated temperatures (i.e., 5° to 25° C.) over that of the prior art. Further, salt is known to be detrimental to the stability of emulsions. Accordingly, by limiting the catalyst concentration and resultant salt formation during the neutralization thereof, the stability of the ultimately produced emulsion is enhanced.

During the preparation of the resole resin, its molecular weight is advanced so that the resin is at most slightly water soluble, preferably not water-soluble, and remain water dilutable after water-insoluble species have been emulsified. The formaldehyde/phenol mixture is maintained from about 65° C. to about 85° C., preferably from about 68° C. to about 76° C. during condensation and methylolation. During this temperature maintenance stage which is prior to neutralization and addition of the formaldehyde scavenger (e.g. urea), the resole resin is advanced in molecular weight such that the resin at this point has a water dilutability within the specified range. A preferred water dilutability range roughly corresponds to a resin number average molecular weight of about 500 to about 700, based on the hydrodynamic volume of polystyrene (polystyrene standard). The period of temperature maintenance is typically at least 180 minutes, and preferably ranges from about 200 to about 500 minutes, to achieve the desired water dilutability depending on the formaldehyde to phenol mole ratio and the reaction temperature selected.

Following the condensation reaction to form the resole, a stoichiometric quantity of an acid such as sulfamic acid, phosphoric acid, sulfuric acid, hydrochloric acid, oxalic acid, acetic acid, maleic acid and carbonic acid, and the like, and their ammonium salts, is added to the reaction mixture in order to neutralize the basic catalyst. Sulfamic acid is preferably employed to neutralize the catalyst. The basic catalyst may also be neutralized by dilution through repeated washings; however, it is preferred to use an acid. Alternatively, the resin may be stored at room temperature or under refrigeration in its alkaline condition and neutralized and emulsified before use. The final resin prior to use should have a pH of about 6 to about 10.

The final phenol-formaldehyde resole resin preferably has a water solubility (water haze point) from about 0.25:1 to at most 2.5:1 (v/v water to resin) at a pH ranging from about 7.5 to about 8.5. Water solubility is a measure of resin molecular weight advancement and if solubility is too high, the resin will not form an emulsion but rather a solution. Furthermore, if the degree of water solubility is too low, then the resin system will either require large amounts of organic solvent to ensure a homogeneous one-phase condition or will have a prohibitively short storage life. Both of these options are unattractive and for the most part impractical.

Thus, prior to adding the emulsifying agent, the resin is at most regarded as slightly water soluble in that the solubility is less than or equal to about 2.5:1 v/v resin to water, more preferably at most 1.5:1, and yet more preferably not water soluble in that solubility is at most 1:1 v/v resin to water. The molecular weight is advanced to reduce the monomer content thereof, thereby reducing emissions during cure. Since the resin is not emulsified on manufacture, it is not detrimentally affected by freezing temperatures prior to dilution, as are emulsions. The emulsifying agent may be added anytime prior to preparing the emulsified composition of the present invention, for example, after the resole is produced or later at the customer's site where the emulsified composition is to be used.

Examples of phenols which can be used in preparing a phenolaldehyde resole for use in practicing the invention include ortho-, para-directing hydroxy or amino aromatic compounds having 6 to 24 carbon atoms such as phenol itself ($C_6H_5OH$), naphthol, anthranol and substituted derivatives thereof where the substituents on the aromatic compound are independently selected from hydrogen; halogen, such as Cl, Br, and F; $NH_2$; and hydrocarbon radicals, such as:

a. alkyl groups or radicals of 1 to 12 carbon atoms, preferably of 1 to 9 carbon atoms, and their various isomeric forms and substituted on the aromatic nucleus in the ortho- or para- position;

b. cycloalkyl groups of 5 to 12 carbon atoms such as cyclohexyl, cyclopentyl, methylcyclohexyl, butylcyclohexyl, and so forth;

c. aryl ketonic groups wherein the hydrocarbon portion is as defined below in (e);

d. alkyl, aryl and cycloalkyl carboxylic groups wherein the hydrocarbon part is defined as above in (a) and (b);

e. aryl groups of 6 to 24 carbon atoms such as phenyl, naphthyl, anthryl, and the like;

f. aryl substituted alkyl wherein the aryl is phenyl which may contain lower alkyl and/or hydroxy substituents so that the resulting hydroxy aromatic is, for example, a bisphenol;

g. the oxyhydrocarbon radicals corresponding to the foregoing hydrocarbon radicals; and h. mixtures of the aforesaid hydroxy aromatics.

Suitable substituted phenols include meta-cresol, m-propyl phenol, m-isobutyl phenol, m-sec-butyl phenol, m-tert-butyl phenol; m-bromo phenol, m-chloro phenol, m-phenyl phenol, m-benzyl phenol, m-cetyl phenol, m-cumyl phenol, m-hydroxyacetophenone, m-hydroxybenzophenone, m-d-limonene phenol. The corresponding phenols substituted in the ortho- and para-positions can be used in part but are not preferred.

Mixtures of various hydroxy aromatic compounds mentioned herein also may be used.

Included among the phenolic reactants which may be used are those known as the "cresylic acids" and these often comprise heterogeneous mixtures having two reacting hydrogen positions on each of them; that is, compounds unsubstituted in the ortho- and para-positions, and hence, yield relatively unreactive resins. These compounds may include the following: 3,5-xylenol, m-cresol, 3,4-xylenol, 2,5-xylenol, 2,3-xylenol, phenol, p-cresol, o-cresol, 2,4-xylenol, and 2,6-xylenol. Cresylic acids or tar acids may include phenol and its homologs which may include cresols, xylenols, trimethyl phenols, ethyl phenols, and higher boiling materials such as dihydroxy phenols, polycyclic phenols and the like. They are often obtained by a low-temperature trimerization of coal, lignite, and the like, or a conventional high-temperature coke oven tar, or the liquid product of petroleum cracking both thermo and catalytic, shell oil, coal hydrogenation products, and the like.

Polyhydroxyaromatic reactants, such as resorcinol, may also be used. Also useful in this invention are mixtures of aniline and phenol to react with an aldehyde or ketone to produce a resole. Additionally, sodium lignosulfonate may also be substituted for a portion of the phenol.

Though not preferred, also useful in the invention are mixtures of urea and phenol to react with the aldehyde or ketone to produce a resole.

Among the aldehydes which may be used within the scope of this invention to produce resoles are formaldehydes or any of its variations, such as 30 percent or higher concentrations of formalin, or paraldehyde, acetaldehyde, propionaldehyde, isobutyraldehyde, isopentaldehyde, and the like. The aldehyde should have not more than 8 carbon atoms and should not detrimentally affect the resinification of the resin. Preferred aldehydes are those having from 1 to 4 carbon atoms, such as formaldehyde, which may be in aqueous solution (e.g. 30 percent or higher), or in any of its low polymeric forms such as paraformaldehyde or trioxane. Other aldehydes include para-aldehydes, furfuraldehyde, 2-ethylhexanal, ethylbutyraldehyde, heptaldehyde, benzaldehyde and crotonaldehyde. Glyoxal may also be used. These other aldehydes and mixtures thereof may be used in place of formaldehyde or in partial substitution thereof; but preferably, formaldehyde in one of its commercially available forms is used.

As a result of advancing the molecular weight of the resole resin, the phenol content is reduced to below 0.5% based on the weight of the resole and the aldehyde content is correspondingly reduced or can be reduced to less than 1%, preferably less than 0.5%, by weight of the resole by reaction with an aldehyde scavenger prior to neutralization of the basic catalyst. Suitable aldehyde scavengers include sodium sulfite, sodium cyanide and nitrogen containing organic compounds soluble in the resole, of molecular weight less than 300, containing a least one NH group molecule reactive with the aldehyde, for example formaldehyde. Examples include ammonia, ammonium hydroxide, primary and secondary amines, urea, substituted ureas, primary amides, dicyandiamide, guanidine, resorcinol, tannins, wattle, Quebracho and aminotriazines such as reelamine, guanamine and benzoguanamine. Preferably, the aldehyde scavengers are urea and/or ammonium hydroxide. The aldehyde scavenging reaction is carried out at the end of the resole reaction during the cooling phase of the reaction when the mixture is at a temperature in the range of about 20° to about 60° C., preferably from about 25° C. to about 50° C., to minimize oligomerization of the resole. The amount of the scavenger added can vary within very wide limits. However, it is preferred to use between 0.5 and 1.5 mole equivalents of scavenger per mole of free aldehyde present at the end of the resole reaction.

In a preferred embodiment of the invention, the phenol aldehyde resole resins are those which are modified with urea. The urea is used as an aldehyde scavenger and is added after the aldehyde and phenol have methylolated and condensed. The urea is introduced into the reaction medium during the cooling phase, preferably once the temperature is maintained at a specific temperature. Alternatively, the urea may be introduced into the reaction medium as soon as cooling begins. In this alternative, the reaction mixture may be cooled at a rate on the order of 1° C. per minute until a temperature of about 30° C. is reached. The urea is introduced at a very uniform rate during this portion of the cooling phase, preferably over a period amounting to at least half the time required for cooling the reactor and the reaction mixture. In general, the resulting urea-extended modified product contains from about 2 to about 25% by weight of urea based on 100 part of phenol.

The urea is preferably not added initially to the phenol and aldehyde wherein the urea condenses with aldehyde concurrently with the phenol. U.S. Pat. No. 5,011,886 to Buschfeld et al. discloses that when urea is directly added to the alkaline reaction mixture of phenol and aldehyde at the beginning of the condensation reaction and the condensation is performed, the resulting resins have insufficient storage stabilities. Moreover, the '886 patent discloses that ammonia is released due to side reactions. This is manifested in an additionally increased alkalinity of the resin, and in annoying odors.

As noted above, the urea is preferably introduced in the reaction medium during the cooling phase, preferably once the temperature is maintained at a temperature from about 25° C. to about 50° C. The ratio of adlehyde, e.g. formaldehyde, to urea is preferably less than 1.0:1. Accordingly, the urea is present in a molar excess relative to aldehyde to make sure the free aldehyde is bound by the urea. For example with formaldehyde as the aldehyde, this has the affect of shifting the equilibrium to favor monomethylolurea and urea and limit dimethylolurea (DMU) formation and precipitation. The molar ratio of aldehyde to urea is preferably greater than 0.85:1 to minimize smoke formation when burned. More preferably, the ratio of aldehyde to urea ranges from about 0.90:1 to about 0.99:1, most preferably about 0.97:1.

The emulsifiable compositions of the present invention are prepared by the addition of a emulsifying agent to the resole resin. The emulsifying agent is one which will contribute to the formation of stable phenolic resin emulsions upon the dilution of the emulsifiable composition with water. The preferred emulsifiers are proteinaceous compounds which are soluble in aqueous media at a pH form about 6 to about 8.5. Such alkali solulizable proteinaceous compounds are well known to those of ordinary skill in the art. In general, they are amphoteric but are used in the present invention only at a pH from about 7 to about 10. The most commonly used proteinaceous materials of this type are casein and soya proteins; common molecular weights ranging from 100,000 to 400,000. Though not as preferred, other emulsifiers include gum arabic, guar gum, Karaya gum, ammonium alginate, polyvinyl alcohol, polyvinyl acetate and carboxylated methylcellulose. Such emulsifiers may be suitable when the emulsified composition is prepared on site prior to use, for example by using an in-line mixer and thereafter utilizing the emulsified composition. Other emulsifier systems which may be conveniently used are combinations of gum arabic and polysaccharides consisting essentially of mannose and galactose units or consisting essentially of D-mannuronic and L-guluronic acid units when the ratio of the gum arabic to the other polysaccharides is about 0.5:1 to about 20:1.

Suitable aqueous solutions of the proteinaceous compound may be prepared in the presence of alkali metal hydroxides, alkali metal carbonates, ammonium hydroxide and organic amines, e.g., urea, dicyandiamide, triethylamine, and the like, as well as mixtures of the foregoing. The solution of proteinaceous compound contains between 10 and 30 % by weight proteinaceous compound. The amount of proteinaceous compound which is added to the resole resin is the range of about 0.5 to about 20 parts proteinaceous compound per 100 parts of resole resin solids, i.e. about 0.25% to about 10% by weight of the proteinaceous compound based on the combined weight of the proteinaceous compound and the resole resin solids. It is advantageous to add urea or dicyandiamide to the aqueous solution of protein as a viscosity depressant. As earlier noted, the urea or dicyandiamide also acts to reduce the free aldehyde, e.g. formaldehyde, when the aqueous solution is added to the resole resin. Although not required, if used, the amount of urea or dicyandiamide effective for these purposes is in the range of about 1 to about 100 parts by weight of urea per 100 parts of proteinaceous compound, i.e. about 0.5 % to about 50% by weight urea based on the combined weight of the urea and the proteinaceous compound.

The quantity of proteinaceous compound necessary for stability of the aqueous water dilutable phenolic resin is determined by the aldehyde-phenol mole ratio during the the reaction phase and the final molecular weight of the resole component. In general, a high molecular weight requires a high concentration of proteinaceous compound. The preferred quantity of proteinaceous compound is (between 0.1 and 5 weight % of total resin solids. Below 0.1 weight percent, the phenolic resin system loses its water emulsifiability; while above 5 weight % proteinaceous compound, the phenolic resin system is not cost effective under present economic circumstances.

Casein is preferably utilized as the emulsifying agent and is present in the composition from about 1 to about 5% by weight based on the total composition. The end point pH of the resole controlled to about 7.5 to about 8.5 to ensure proper performance of the casein, for example, by using an acid, e.g. sulfamic acid. The casein solution in the emulsion system is prepared by dissolving urea in water and then dispersing casein in the urea solution to form a slurry. The urea helps reduce the viscosity of the casein solution when the casein dissolves. After some 30 to 60 minutes, aqueous sodium hydroxide, and optionally ammonium hydroxide, is added for solubilization. Mixing is continued until a solution is formed. The solution is then added to the aqueous resole. As earlier noted, ammonium hydroxide and urea also have the added value of being aldehyde scavengers. The free aldehyde is scavenged to 1% by weight or less, based on the total composition, before the addition of the casein to avoid reaction and precipitate aldehyde. Such is readily satisfied by the requirement that the composition of the present invention have a free aldehyde content of less than 1% by weight.

While the phenol-formaldehyde condensation reaction is generally carried out in an aqueous medium with a formalin solution containing between about 30 and about 60 weight percent formaldehyde or in an anhydrous medium with para-formaldehyde, optionally there maybe present an organic solvent which is a solvent for the phenol-formaldehyde resole resin or which is a mutual solvent for the resole resin and water. The solvent is removed from the resole resin prior to the addition of the aqueous solution of proteinaceous compound. This is not a preferred embodiment of the present invention due to the additional steps involving adding and removing the organic solvent and associated environmental problems.

The clear, one-phase homogeneous, emulsifiable resins of the present invention maybe easily convened to resin in water emulsions by simple addition of water with sufficient agitation to permit effective blending of the water. This can normally be accomplished with the use of conventional propeller, blade or turbine agitators. The emulsifiable composition of the present invention is regarded as self-emulsifying upon dilution. No precipitation results even up to a 50:1 v/v water to resin dilution. The resin and the emulsifier form micelles with particle sizes less than about 0.16 microns, thereby yielding a micro-emulsion. Accordingly, the resin and water emulsions formed are characterized by excellent stability with regard to sedimentation and shear.

The emulsified resin systems of this invention are useful as binders for insulation and air filtration products and in the impregnation of cellulosic sheet members. Typical resin solids contents of the emulsified phenolic composition for insulation and air filtration purposes ranges from about 1% to about 15% by weight resin solids. Typical resin solids contents of the emulsified phenolic for cellulosic sheet impregnation range from about 5% up to 45% by weight resin solids. Commonly, the quantity of resins falls in the range of from about 8 to about 25% by weight solids. Impregnation is accomplished by any conventional means, where upon the substrate material is dried to lower the volatiles content and then is heated to advance the resin to a desired degree. Typical quantities of resin in a treated sheet range from about 10 to about 40% by weight with mounts ranging from about 15 to about 30% by weight being particularly common. The resin treated sheet members are employed in the manufacture of automotive oil filters, air filters and fuel filters, the individual sheets being folded, convoluted, etc. and then packaged in an appropriate filter cartridge, as all of those skilled in the art fully appreciate.

The stable single phase aqueous phenol formaldehyde resin of the present invention are particularly useful in applications which require low pollution potential on application. Because of the low levels of residual phenol and formaldehyde possible by this invention and the ability to use a variety of formaldehyde scavengers with the resin to further lower the formaldehyde content, undesirable volatiles generated by drying and curing resole emulsions are significantly reduced. The aqueous resole emulsions also possess very little of the strong odor of phenol and formaldehyde and this lack of odor is readily apparent when the resole is applied from open dipped tanks, or coaters onto substrates which are passed over drying rolls, through drying ovens, or into curing presses and ovens perhaps in poorly vented areas. Also, cured products produced with these resins are relatively free of residual odor caused by entrapped volatiles such as phenol, formaldehyde and their reaction products.

The emulsions of the present invention maybe formulated with lubricants, defoamers, plasticizers, softening agents, pigments and other conventional additives without departing from tile scope of the invention. In particular, where the emulsions are used in impregnation of cellulosic substrates, there are advantageously formulated with anti-migratory agents of the type described in U.S. Pat. No. 3,719,616.

The primary advantages of the present resin are its storage stability prior to emulsification and reduced emissions during cure effected by reducing monomer content therein by advancement of the molecular weight and scavenging of the formaldehyde. Further, there is no need for use of organic solvents in the preparation of the resin nor in the preparation of the emulsion using same. The resin is emulsified as an oil in water emulsion. One utility envisioned for the emulsifiable resin is to dilute the resin to a 1 to 15% by weight solids content for use in the insulation and air filtration industry.

The following examples are set forth to illustrate the principles and practices of the present invention to one skilled in the art. They are not intended to be restrictive but merely to be illustrative of the invention. Unless otherwise stated, all parts, percentages and ratios are on a weight basis. Water dilutability and water haze points are on volume to volume basis water to resin. Solids are determined by the Manville solids method. The Manville solids method requires diluting two grams of a resin and ten millimeters of methanol, placing the resin/methanol mixture in a pan equipped with a lid and curing the resin at 150° C. for two hours (with the lid closed to prevent splattering of the pan contents during the cure, thereby avoid or minimize the loss of material from the pan). The residue is weighed and the difference between the resin before diluting and after curing is the measured resin solids.

All the examples described below relate to the same method of operation, details of which will be given.

The resin is obtained as follows. Formaldehyde and phenol are introduced into a reactor. Mixture is then either heated or cooled with mechanical stirring until a temperature slightly above the melting point of phenol is obtained. Mechanical stirring is continued during this whole reaction cycle. The catalyst is introduced at a uniform rate and then, immediately after all the catalyst has been added, the temperature of the mixture is raised to a level suitable for optimum condensation and formation of the emulsifiable resin. This temperature is maintained until the desired water haze point is attained.

Cooling of the reactor and the reaction medium is then begun. The methylolation reaction is terminated by cooling while the condensation reaction product is still water soluble. The aldehyde scavenger is preferably introduced once the cooling has been stopped and the temperature is maintained at a temperature ranging from about 25° C. to about 50° C. The temperature is maintained at this level until the aldehyde scavenger, e.g. urea, dissolves (if needed) and scavenges the free aldehyde to less than 1% by weight; generally, at least ten minutes after the urea dissolves.

EXAMPLE 1

In this example, a 3.5 mole ratio formaldehyde to phenol resin was prepared using sodium hydroxide as the catalyst at NaOH-phenol mole ratio of 0.0935 (i.e., 0.9% by weight sodium hydroxide (added 1.8% by weight aqueous sodium hydroxide containing 50% NaOH) based on the weight of the resin composition). The phenol and formaldehyde were added to the reactor and brought to about 55° C. The sodium hydroxide was then added over about 20 minutes while the temperature was maintained at about 55° C. The reactor contents were then heated to about 68° C. over a thirty minute period. A hold time of 420 minutes was used for methylolation and condensation. The resin at this point had a water dilutability of about 6.5:1. After the hold time expired, the resin was cooled to about 40° C. Urea was then added at a urea to phenol mole ratio of about 1.20:1 (in other words a formaldehyde to urea mole ratio of about 0.97:1). The urea was allowed to react (with the free-formaldehyde) for about 30 minutes, then the resin was neutralized with sulfamic acid to a pH of 8.0. Thereafter, the resin was cooled to about 25° C. Ammonium hydroxide was then added a mole ratio of 0.08:1 (ammonia mole equivalents per mole of originally introduced phenol). The water haze point of the finished resin prior to adding the emulsifying agent was about 1.5:1.

A casein solution was then added to the resin at about 5% by weight based on the overall composition. The composition of the casein solution was 58.9375% by weight water, 20% by weight urea, 20% casein, 0.0625% by weight aqueous sodium hydroxide (50% sodium hydroxide) and 1% by weight aqueous ammonium hydroxide (28% ammonium hydroxide). The casein utilized in the casein solution was LT-3A obtained from National Casein, Santa Ana, Calif. HC-200 also available from National Casein is another example of a suitable, commercially available casein. The casein solution was prepared by dissolving urea in water and then dispersing casein in the urea solution to form slurry. After about 30 minutes, aqueous sodium hydroxide and ammonia hydroxide were added to aid in the solubilization of the casein. Mixing was continued until a solution was formed. The temperature utilized in the preparation of the casein solution was 60° C. to also aid in the solubilization of casein and the destruction of the enzymes which are present in the casein. It is noted that if the casein solutions are to be part of the system which has a long shelf life, the importance of the destruction of the enzymes by heat cannot be overlooked. Even in the presence of adequate preservatives, these enzymes can cause a drop in viscosity over a period of time due to destructive hydrolysis.

The resulting resole-resin solution was an amber clear resinous liquid with a faint sweet smell, that emulsifies with the addition of water at a dilution of approximately 1:1 with water. This composition had a free-formaldehyde of about 0.6% by weight, a phenol content of about 0.02% by weight, a number average molecular weight ($M_n$) of the phenolic resin components as based on polystyrene standards of 600 and a weight average molecular weight ($M_w$) of phenolic resin components as based on polystyrene standards of about 750.

The storage life of a stable emulsion of this emulsifiable resole resin composition was tested. The test comprised storage at a predetermined temperature and thereafter determining the time at which time the resole resin composition lost its ability to emulsify or formed a precipitate in the storage container. The ability of this composition to form a stable emulsion was measured by diluting one part by volume of the resinous composition with 50 parts by volume de-ionized water. Further, the storage container was checked for evidence of precipitation during storage. At a storage temperature of 25° C., the resin lost ability to emulsify after 15 days of storage and no precipitate was formed during storage. At 15° C., the resinous composition lost its ability to emulsify after 40 days of storage and no precipitate was formed during storage. At 5° C., the resin did not lose its ability to emulsify even after 45 days. (Stopped testing after 45 days). No precipitate had formed during storage.

EXAMPLE 2

In this example, a 2.7:1 formaldehyde to phenol mole ratio (F/P Ratio) resole resin was prepared. About 1,132 grams of phenol and about 1,948 grams of formalin (50% formaldehyde) were loaded into the reactor. About 13 grams of water were added. At this point the temperature of the mixed contents of the reactor was about 50° C. About 40 grams of aqueous sodium hydroxide (50% sodium hydroxide) were added to the reactor over a 15 minute period with a reactor temperature of about 55° C. Thereafter, 36 grams of aqueous sodium hydroxide were added to the reactor over a 30 minute period maintaining the temperature at about 55° C. Thereafter, the reactor contents were heated to about 76° C. over a 30 minute period. The reactor contents were held at about 76° C. for methylolation and condensation until the free phenol was less than about 0.3% by weight and the water dilutability was less than 6:1. The hold time at 76° C. was about 195 minutes. At this point, the free phenol content was about 0.25% by weight and the water dilutability was about 5.0:1. The free formaldehyde at this point was about 5.31%. The reactor contents were then cooled to about 40° C. over a 30 minute period. About 347 grams of urea were added over a 10 minute period while maintaining the temperature at about 40° C. Thereafter, about 20 grams of aqueous ammonium hydroxide (28% ammonium hydroxide) was added to the reaction mixture below the surface of the reaction mixture over a 5 minute period while continuing to maintain the temperature at about 40° C. Thereafter, about 50 grams of sulfamic acid were added over a 5 minute period while continuing to maintain the temperature at about 40° C. The pH at tiffs point was about 8. The reactor contents were then cooled to about 30° C. over a 30 minute period and then allowed to cool to about 25° C. The casein solution was then added to the reactor contents and mixed for about 5 minutes. At this point, the free formaldehyde was about 0.57% by weight. The resin solids was about 54% by weight.

The casein solution was prepared without a urea addition. The formulation of the casein solution was about 78.9% by weight water, 0.1% by weight aqueous sodium hydroxide (50% sodium hydroxide), about 20% by weight casein (HC-200 available from National Casein) and about 1% by weight aqueous ammonium hydroxide (28% ammonium hydroxide). To prepare the casein solution, the water was heated to about 45° C. The aqueous sodium hydroxide was then added. Next the casein was added to the solution using vigorous agitation. After the casein was dispersed, the aqueous ammonium hydroxide was added. The mixture was heated to about 60° C. and maintained at about 60° C. for about 5 minutes. Vigorous agitation was maintained during all the steps of the solution preparation.

EXAMPLE 3

In this example, a 4.3:1 formaldehyde to phenol mole ratio resole resin was prepared. About 649 grams of phenol and about 1,775 grams of formalin (50% formaldehyde) and about 25 grams of water were loaded into the reactor. The temperature was adjusted to about 55° C. About 25 grams of aqueous sodium hydroxide (50% sodium hydroxide) were added over a 15 minute period while maintaining the temperature of the reactor at about 55° C. Thereafter, another 25 grams of aqueous sodium hydroxide were added to the reactor contents over a 25 minute period while still maintaining a temperature of about 55° C. The reactor contents were then heated to about 72° C. over a 30 minute period. The reactor contents were held at about 72° C. until a water dilutability of about 6.5:1 was attained. The hold time was about 280 minutes. Thereafter, the reactor contents were cooled to 50° C. The free formaldehyde content at this point was about 15.3% by weight. About 783 grams of urea were added to the reactor contents while maintaining the temperature at about 50° C. The reactor contents were then cooled to about 40° C. over a 30 minute. The pH at this point was about 8.9. About 37 grams of sulfamic acid were added to adjust the pH of the system to about 8. The reactor contents were then cooled to about 25° C. At this point about 350 grams of water were added to the reactor contents. Further, about 35 grams of aqueous ammonium hydroxide (28% ammonium hydroxide) were added. The temperature was held at about 25° C. for about 10 minutes to ensure complete mixing.

At this point, about 100 grams of the casein solution was added to the reactor contents. The reaction contents were mixed for about 10 minutes. The casein solution was prepared with a urea addition. The formulation was about 68.9% by weight water, 0.1% by weight aqueous sodium hydroxide (50% sodium hydroxide), about 10% by weight urea, about 20% by weight casein (HC-200 available from National Casein) and about 1% by weight aqueous ammonium hydroxide (28% ammonium hydroxide). The casein solution was prepared as follows: The urea was dissolved in the water using agitation. The solution was then heated to about 45° C. The aqueous sodium hydroxide was then added. Next, the casein was added to the solution using vigorous agitation. After the casein was dispersed, aqueous ammonium hydroxide was added. The mixture was then heated to about 60° C. and maintained at about 60° C. for about 5 minutes. Vigorous agitation was maintained during all steps of the solution preparation.

The solids content the resole resin was about 49.5% by weight. The free formaldehyde content was about 0.6% by weight (Free F) and the free phenol content was less than 0.01% by weight (i.e., less than detection limits of equipment and procedure used).

Table 1 tabulates various properties of the neat resin of the emulsifiable resin (i.e., after adding the emulsifying agent) and the emulsified resin.

TABLE 1

| Resin (Example) | 1 | 2 | 3 |
|---|---|---|---|
| F/P Ratio | 3.5 | 2.7 | 4.3 |
| Free Phenol (%) | 0.2 | 0.17 | 0.01 |
| Free F (%) | 0.6 | 0.6 | 0.6 |
| Molecular Weight | | | |
| Mn | 600 | 585 | 599 |
| Mw | 750 | 764 | 854 |
| Water Dilute (Reaction Phase) | 6.5:1 | 5:1 | 6.5:1 |
| Water Haze (Final Resin) | 1.5:1 | 2:1 | 2:1 |
| Solids Content (%) | 54 | 54 | 49.5 |
| Storage Life(day) | | | |
| 5° C. | 45+ | 40+ | — |
| 15° C. | 40 | 40 | — |
| 25° C. | 15 | 14 | — |

A. Average of two values: for Mn, 578 and 592; for Mw, 761 and 767.

The storage life data regarding the resins prepared in Examples 1 and 2 demonstrate the stability of the emulsified resin for long periods of time at elevated temperatures conventionally used for storage of such materials, i.e., for about about 5° C. to about 25° C. The storage life tests regarding the resin of Example 3 is expected to be substantially equivalent to that obtained for the resins of Example 1 and 2.

Accordingly, the present invention provides a novel means for stabilizing formed tetramer formed in the phenol/aldehyde resins prepared herein.

Although various embodiments of the present invention have been discussed herein, those skilled in the art will appreciate the changes and modifications made without departing from the spirit of the invention, as deemed in and limited only by the scope of the appended claims.

I claim:

1. An emulsifiable phenolic resole resin composition comprising a mixture of a resole resin and an emulsifying agent wherein said resole resin is prepared by (i) reacting in a one-stage reaction a phenol and an aldehyde at a temperature in the range from 65° C. to about 85° C. and at a mole ratio of aldehyde to phenol in the range from about 2.0:1 to about 6.0:1 in the presence of an effective catalytic amount of a basic catalyst having a mono-valent alkali metal cation, said effective catalytic amount not to exceed 1% by weight of said composition, to obtain a resin having a water dilutability of from about 2:1 to 10:1 v/v water to resin, (ii) neutralizing the basic catalyst, and (iii) adding an aldehyde scavenger, said composition having a free phenol content below 0.5% by weight and a free aldehyde content below 1% by weight.

2. A method for preparing a phenolic resole resin composition comprising:
   (1) reacting in a one-stage reaction a phenol and an aldehyde at a temperature in the range from 65° C. to about 85° C. and at a mole ratio of aldehyde to phenol in the range from about 2.0:1 to about 6.0:1 in the presence of an effective catalytic amount of a basic catalyst having a mono-valent alkali metal cation, said effective catalytic amount not to exceed about 1% by weight of said composition, to obtain a resin having a water dilutability of from about 2:1 to 10:1 v/v water to resin and a free phenol content below 0.5% by weight,
   (2) neutralizing the basic catalyst, and
   (3) adding an aldehyde scavenger to reduce the free aldehyde of the resin to below 1% by weight.

3. The composition of claim 1, wherein the water dilutability ranges from about 3:1 to about 7:1.

4. The composition of claim 1, wherein the aldehyde is formaldehyde.

5. The composition of claim 1, wherein the phenol is phenol ($C_6H_5OH$).

6. The composition of claim 5, wherein the aldehyde is formaldehyde.

7. The composition of claim 1, wherein the resole resin after neutralization and adding the aldehyde scavenger has a water haze point less than or equal to 2.5:1 v/v water to resin and remains water dilutable after water-insoluble species therein have been emulsified.

8. The composition of claim 7, wherein the water haze point is less than or equal to 1.5:1 v/v water to resin.

9. The composition of claim 8, wherein the water haze point is less than or equal to 1:1 v/v water to resin.

10. The composition of claim 1, wherein the mole ratio of aldehyde to phenol ranges from about 2.5:1 to about 5.0:1.

11. The composition of claim 1, wherein the emulsifying agent is a proteinaceous emulsifying agent.

12. The composition of claim 11, wherein the proteinaceous emulsifying agent is casein.

13. The method of claim 2, wherein the water dilutability ranges from about 3:1 to about 7:1.

14. The method of claim 2, wherein the aldehyde is formaldehyde.

15. The method of claim 2, wherein the phenol is phenol ($C_6H_5OH$).

16. The method of claim 15, wherein the aldehyde is formaldehyde.

17. The method of claim 2, wherein the resole resin after neutralization and adding the aldehyde scavenger has a water haze point less than or equal to 2.5:1 v/v water to resin and remains water dilutable after water-insoluble species therein have been emulsified with an emulsifying agent.

18. The method of claim 17, wherein the water haze point is less than or equal to 1.5:1 v/v water to resin.

19. The method of claim 18, wherein the water haze point is less than or equal to 1:1 v/v water to resin.

20. The method of claim 2, wherein the mole ratio of aldehyde to phenol ranges from about 2.5:1 to about 5.0:1.

21. The method of claim 17, wherein the emulsifying agent is a proteinaceous emulsifying agent.

22. The composition of claim 21, wherein the proteinaceous emulsifying agent is casein.

23. A method for preparing an emulsifiable phenolic resole resin composition comprising:
   (1) reacting in a one-stage reaction a phenol and an aldehyde at a temperature in the range from 65° C. to about 85° C. and at a mole ratio of aldehyde to phenol in the range from about 2.0:1 to about 6.0:1 in the presence of an effective catalytic amount of a basic catalyst having a mono-valent alkali metal cation, said effective catalytic amount not to exceed 1% by weight of said composition, to obtain a resin having a water dilutability of from about 2:1 to 10:1 v/v water to resin,
   (2) neutralizing the basic catalyst,
   (3) adding an aldehyde scavenger and
   (4) adding an emulsifying agent,
wherein said composition has a free phenol content below 0.5% by weight, a free aldehyde content below 1% by weight, and a water haze point measured before adding the emulsifying agent of less than or equal to 2.5:1 v/v water to resin.

24. A phenolic resole resin composition prepared by:
   (1) reacting in a one-stage reaction a phenol and an aldehyde at a temperature in the range from 65° C. to about 85° C. and at a mole ratio of aldehyde to phenol in the range from about 2.0:1 to about 6.0:1 in the presence of an effective catalytic amount of a basic catalyst having a mono-valent alkali metal cation, said effective catalytic amount not to exceed about 1% by weight of said composition, to obtain a resin having a water dilutability of from about 2:1 to 10:1 v/v water to resin and a free phenol content below 0.5% by weight,
   (2) neutralizing the basic catalyst, and
   (3) adding an aldehyde scavenger to reduce the free aldehyde of the resin to below 1% by weight.

* * * * *